US 7,234,836 B2

(12) United States Patent
Briese (10) Patent No.: US 7,234,836 B2
(45) Date of Patent: Jun. 26, 2007

(54) REFLECTOR ARRANGEMENT COMPRISING SUCCESSIVELY ARRANGED ILLUMINATION MEANS

(75) Inventor: Hans-Werner Friedrich Briese, Gelbelstr. 46A, 22303 Hamburg (DE)

(73) Assignee: Hans-Werner Friedrich Briese, Hamburg (DE)

( * ) Notice: Subject to any disclaimer, the term of this patent is extended or adjusted under 35 U.S.C. 154(b) by 0 days.

(21) Appl. No.: 10/534,045

(22) PCT Filed: Nov. 5, 2003

(86) PCT No.: PCT/EP03/12360

§ 371 (c)(1),
(2), (4) Date: Nov. 10, 2005

(87) PCT Pub. No.: WO2004/042274

PCT Pub. Date: May 21, 2004

(65) Prior Publication Data

US 2006/0126340 A1    Jun. 15, 2006

(30) Foreign Application Priority Data

Nov. 6, 2002    (DE) ............................... 102 52 283

(51) Int. Cl.
*F21V 14/00*    (2006.01)
(52) U.S. Cl. ...................... 362/241; 362/236; 362/238; 362/250; 362/512
(58) Field of Classification Search ................ 362/512, 362/514, 507, 238–239, 232, 285–286, 289, 362/304, 319, 449, 270, 277, 11, 16, 18, 241, 362/250; 313/114
See application file for complete search history.

(56) References Cited

U.S. PATENT DOCUMENTS

| 1,262,394 | A | | 4/1918 | Schickering |
| 4,757,425 | A | | 7/1988 | Waltz |
| 5,582,479 | A | * | 12/1996 | Thomas et al. ............. 362/277 |
| 2002/0093827 | A1 | | 7/2002 | Ishida |

FOREIGN PATENT DOCUMENTS

| DE | 197 49 181 A1 | 11/1997 |
| JP | 2-288001 | 11/1990 |

* cited by examiner

*Primary Examiner*—Renee Luebke
*Assistant Examiner*—Robert May
(74) *Attorney, Agent, or Firm*—Mattingly, Stanger, Malur & Brundidge, P.C.

(57) ABSTRACT

A reflector arrangement for the adjustment of shadow in the field of photography and firm includes inner and outer reflectors which are arranged inside each other and in the region of a central axis of the reflector arrangement, in addition to a carrier element for receiving two illumination means arranged one behind the other. The carrier element is constructed as a focusing unit for the lighting means so that the focusing unit is slidable axially in a longitudinal direction of the center axis of the reflectors relative to the outer reflector. The inner reflector is arranged in the region of the lighting means on the focusing unit. The invention enables the parts of hard and soft light to be adjusted on the reflector arrangement, such that any characteristics can be adjusted using one and the same reflector arrangement.

11 Claims, 7 Drawing Sheets

REFLECTOR ARRANGEMENT COMPRISING SUCCESSIVELY ARRANGED ILLUMINATION MEANS

BACKGROUND OF THE INVENTION

1. Field of the Invention

The invention concerns a reflector arrangement, including a first reflector, a second reflector which is arranged inside the first reflector, wherein the two reflectors are arranged in the region of and preferably on a centre axis of the reflector arrangement, and a carrier element for receiving at least one lighting means.

2. Description of the Related Art

Known reflector arrangements of this kind are used in particular in the field of photography or film. In the region of the centre axis of the reflector arrangement is arranged the carrier element which also carries the lighting means. The object to be illuminated is irradiated by the lighting means and the reflector. In the process, the light radiation of the lighting means including the light rays reflected at the reflector ensures a reflector-specific shadow on the object.

It is, however, precisely in the field of photography that it is necessary to allow reproduction of the object which is as variable as possible. Furthermore, the extent of contrast is to be adjustable precisely and to a very large extent, namely, from shadow-free to deep shadow. This means e.g. that deep or hard shadows are brightened to such an extent that they become transparent, and so very dark areas are adjustable with nuances. If, however, the traditional reflector arrangements are used, only a reflector-specific shadow is to be produced in each case. In other words, the reflector unit determines the characteristic of the shadow, so that a separate reflector arrangement must be used for each characteristic. In order now to change these shadows, that is, darken, brighten, make light diffuse or the like, usually additional reflectors, brighteners, diffusers or the like are used. In addition to the extra expenditure due to setting up further reflectors, brighteners, diffusers or other apparatus, this also leads to additional shadows, as lateral light is produced by the reflectors. To obtain a desired picture quality, a considerable construction is therefore to be provided, which may consist of several reflectors, brighteners, diffusers or the like.

From DE 38 09 333 is known a photographic lamp in which an auxiliary reflector is arranged inside a main reflector. A carrier is provided for receiving several lamps arranged adjacent to each other. But this lamp allows only very limited adjustment of the shadow.

BRIEF SUMMARY OF THE INVENTION

It is therefore the object of the invention to provide a reflector arrangement which ensures individual adjustment of a shadow, in particular the characteristic and the contrast.

This object is achieved by a reflector arrangement of the kind mentioned hereinbefore by the fact that at least one further lighting means is arranged and that the two lighting means are arranged one behind the other near the centre axis. With this additional lighting means in the arrangement described it is possible to vary the characteristic of lighting by the fact that the proportion of direct light rays for producing a hard shadow and the proportion of indirect, reflected light rays for brightening the shadow is variable. Depending on the position of the additional reflector relative to the outer larger reflector on the one hand and relative to the lighting means on the other hand, a different contrast can be obtained or adjusted. The additional second reflector shields part of the light rays in such a way that impingement on the outer large reflector is prevented. As a result, the proportion of reflected light is reduced. On the other hand, the more light rays are reflected by the outer reflector, the greater is the effect of brightening the shadow. Due to the arrangement of the two reflectors in the region of and preferably on the same centre axis, concentric brightening is achieved and a homogeneous lighting characteristic is produced. Due to the arrangement of two lighting means, diverse adjustment of the contrast of the shadow is ensured, as one lighting means can produce so-called "soft" light for brightening the shadow and the other lighting means can produce so-called "hard" light for forming a hard shadow. Due to the combination of two lighting means with two reflectors, the whole bandwidth of contrast is adjustable, namely, light with exclusively hard shadow and high contrast as well as light with exclusively soft shadow and low contrast.

Advantageously, the additional second reflector is slidable in the longitudinal direction of the centre axis of the carrier element or focusing unit, so that the proportion of direct and indirect radiation and hence of hard and soft shadow or light is individually adjustable.

In a preferred development of the reflector combination according to the invention, each lighting means is separately controllable, so that the light characteristic is additionally adjustable via the luminosity or intensity of the respective lighting means. Thus even greater variability is provided with respect to the desired illumination with a single reflector unit or arrangement.

Advantageously, in the region of at least one lighting means is arranged a filter element. By the or each filter element or a combination of filter elements, further adjustments can be achieved, in particular as far as infinitely variable colour shading is concerned. With several different colour filters, even any desired colour tints can be mixed, so that photos can be obtained creatively and with any desired characteristic simply by preliminary adjustment of the reflector arrangement according to the invention. Finishing can be completely dispensed with.

Further preferred embodiments of the invention are apparent from the subsidiary claims and the description. Particularly preferred embodiments are described in more detail with the aid of the attached drawings. The drawings show:

DETAILED DESCRIPTION OF THE INVENTION

The reflector arrangements 10 described below are used in particular for lighting purposes in photography and in film.

Figure 1:
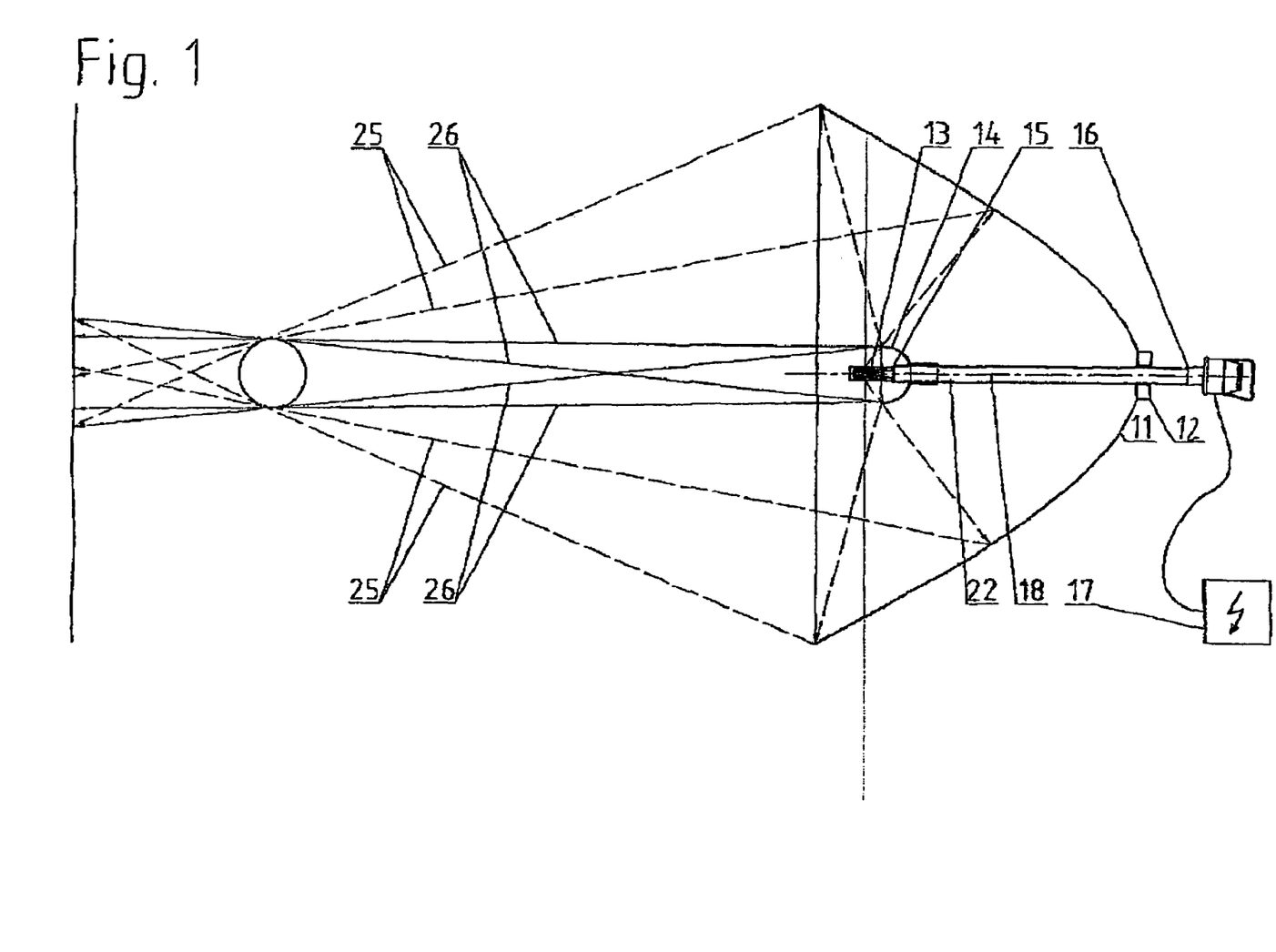
FIG. 1 is a side view of the reflector arrangement, an illuminated object with background being shown for illustration.

In FIG. 1 is shown a reflector arrangement which essentially consists of a first reflector 11, a carrier element 12, a lighting means 13 and a second reflector 14. The lighting means 13 is arranged at a free end 15 of the cylindrical carrier element 12 which faces towards the opening of the preferably half-shell-shaped reflector 11. At the free end 16 of the carrier element 12 opposite the lighting means 13 is arranged a mains- and/or battery-operated energy source 17 for operating the lighting means 13. The energy source 17 is controllable and/or regulatable in such a way that the luminosity or intensity of the light rays 25, 26 is adjustable.

In the embodiment shown in FIG. 1 the small reflector 14 is arranged inside the large reflector 11 in the region of the carrier element 12. The two reflectors 11, 14 are arranged in the region of and preferably on the same centre axis 18 of the carrier element 12. The openings of the two reflectors 11, 14 in this case face in the same direction. The carrier element 12 is arranged on the reflector 11 slidably to form a focusing unit 22 for the lighting means 13. The reflector 14 is arranged on the focusing unit 22 in the region of the lighting means 13, wherein the reflector 14 at least partially covers the lighting means 13 or the light rays 25, 26 produced by the lighting means 13. This means that light rays 25, 26 of the lighting means 13 are at least partially prevented from impinging on the inside 19 of the reflector 11. In other words, the reflector 14 splits the light rays 25, 26 to the effect that some of the light rays, namely, the light rays 25, impinge on the reflector 11 to produce "soft" light or "soft" shadow with low contrast. Some other light rays, namely, the light rays 26, are reflected by the reflector 14 itself to produce the "hard" light or "hard" shadow with high contrast.

The reflector 14 can be arranged in the most varied positions, this being from a position in which the lighting means 13 is completely surrounded by the reflector 14 so that no light rays 25 can impinge laterally on the outer reflector 11, to a position in which all the light rays 25 of the lighting means 13 can impinge unhindered on reflector 11. By displacement of the focusing unit 22 axially in the longitudinal direction thereof, that is, parallel to the centre axis 18, the proportion of reflected light rays 25 is variable by the reflector 11 and of light rays 26 by the reflector 14. The deeper the reflector 14 is located inside the reflector 11, i.e. the further back the focusing unit 22 is moved, the greater is the proportion of light reflected at the reflector 11, with the result that the light radiated by the lighting means 13 produces a soft lighting impression. If, on the other hand, the focusing unit 22 is moved out to the maximum, such that the reflector 14 completely prevents the impingement of light rays 25 on the reflector 11, so that only the light rays 26 which are reflected at the reflector 14 come into effect, a hard, dark shadow is produced at the object.

Figure 3:
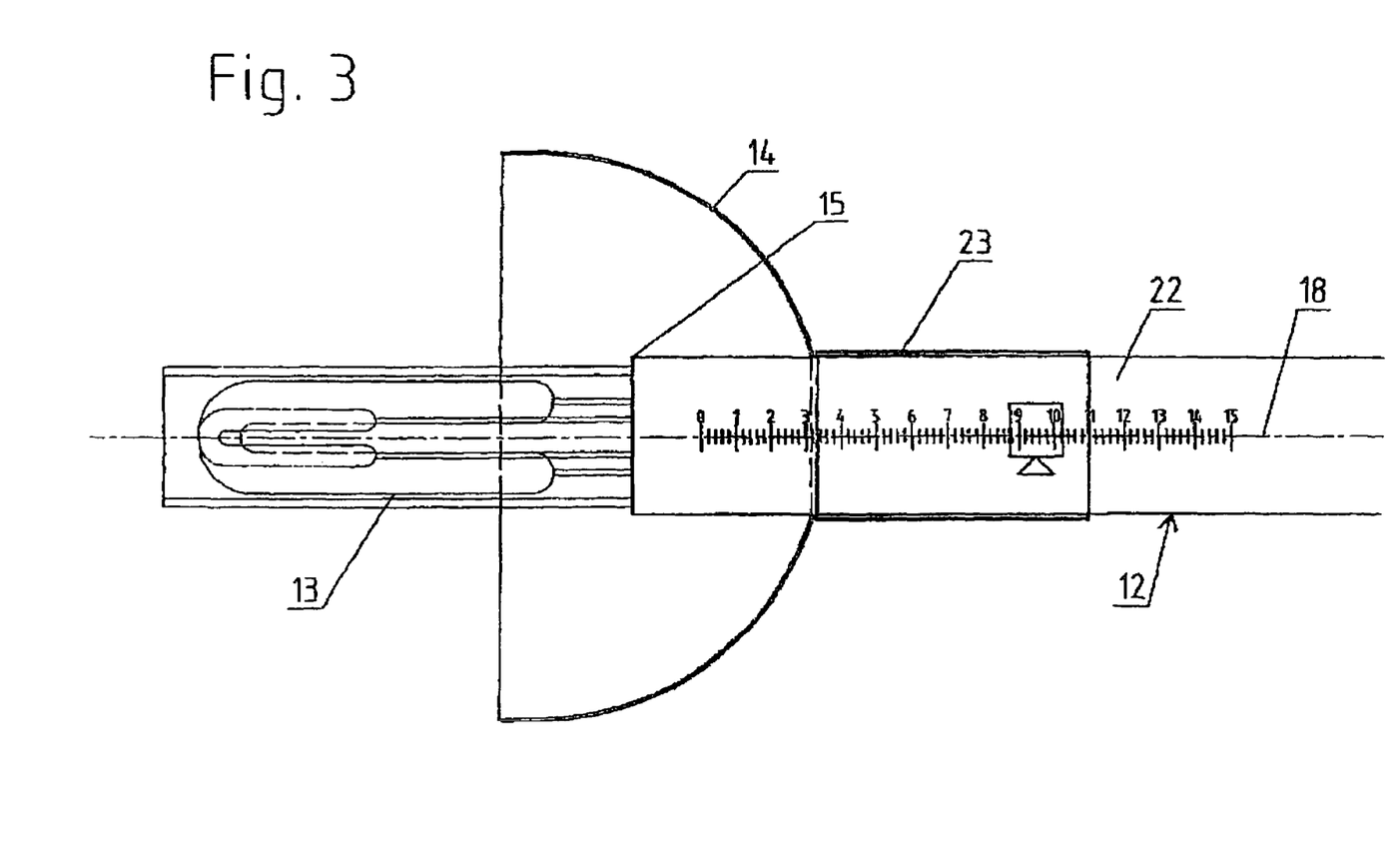
FIG. 3 is a side view of a detail of the reflector arrangement as in FIG. 1.

A preferred arrangement of the reflector 14 in the region of the lighting means 13 is shown in FIG. 3. The reflector 14 is arranged at the free end 15 of the focusing unit 22, so that it surrounds the lighting means 13 approximately one-quarter. In other words, about three-quarters of the lighting means 13 protrude out of the reflector 14, so that a large proportion of the light rays can impinge on the outer reflector 11 as light rays 25. However, any other position of the reflector 14 relative to the lighting means 13 as a function of the desired characteristic is possible.

In order to be able to vary the positioning of the reflector 14, the reflector 14 itself is arranged slidably on a sleeve 23 or the like on the carrier element 12 or focusing unit 22. By superimposing the displacement of the focusing unit 22 on the one hand and of the reflector 14 on the other hand, possibilities for unlimited and infinitely variable adjustment of contrast are ensured. That is to say, the characteristic of the reflector arrangement 10 can be adjusted as desired.

Figure 2:
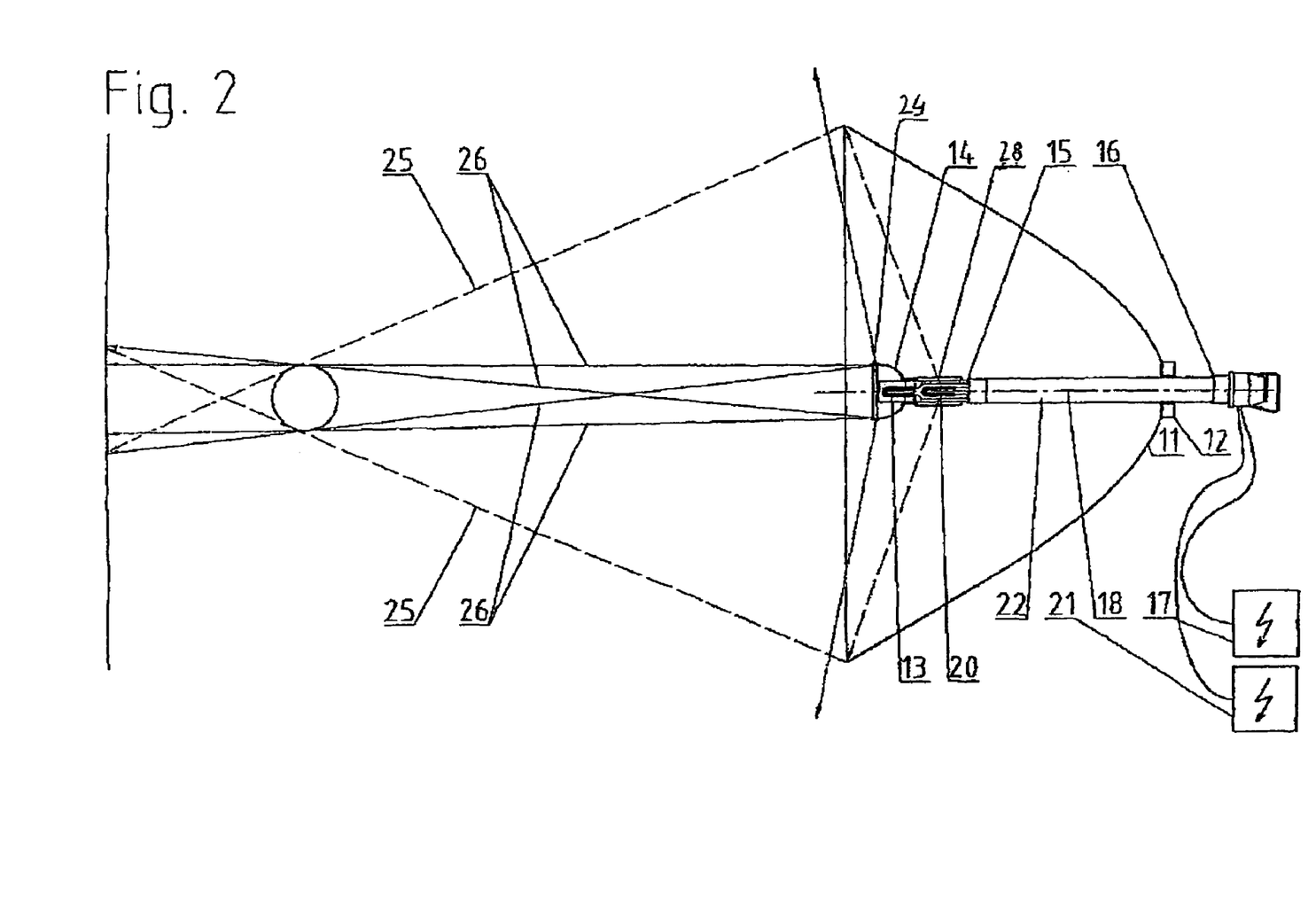
FIG. 2 is a side view of a further embodiment of the reflector arrangement, an illuminated object with background being shown for illustration.
Figure 4:
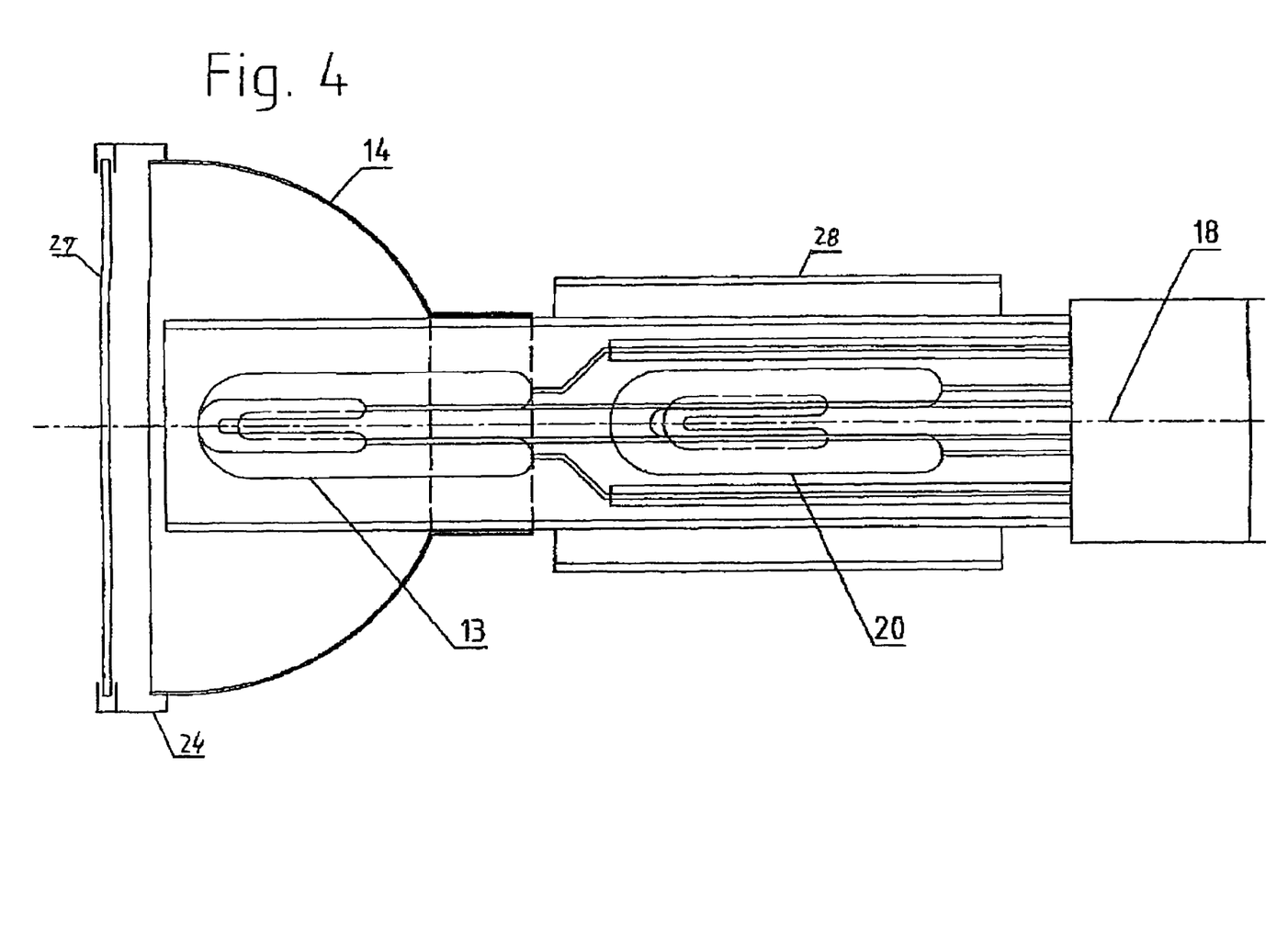
FIG. 4 is a side view of a detail of the reflector arrangement as in FIG. 2.

In the embodiment shown in FIG. 2 is shown a reflector arrangement which in construction and function essentially corresponds to the reflector arrangement as in FIG. 1, so that the same reference numbers are selected for the same parts. But in addition the reflector arrangement has a further lighting means 20. The two lighting means 13 and 20 are arranged one behind the other in the region of the carrier element 12 or focusing unit 22, wherein the lighting means 20 starting from the free end 15 is located behind the lighting means 13. Ideally, the lighting means 13, 20 are arranged in alignment one behind the other. The reflector 14 is arranged in the region of the front lighting means 13. It can be seen from FIG. 4 that the reflector 14 completely surrounds the lighting means 13 in a preferred arrangement. This means that the lighting means 13 is arranged completely inside the reflector 14 and does not protrude beyond it. Due to the possibility of adjustment of the reflector 14 on the one hand and the focusing unit 22 on the other hand, however, any desired arrangements can be achieved. The front lighting means 13 shielded by the reflector 14 serves mainly to produce hard shadow, while the lighting means 20 serves mainly to produce soft shadow.

Figure 5:
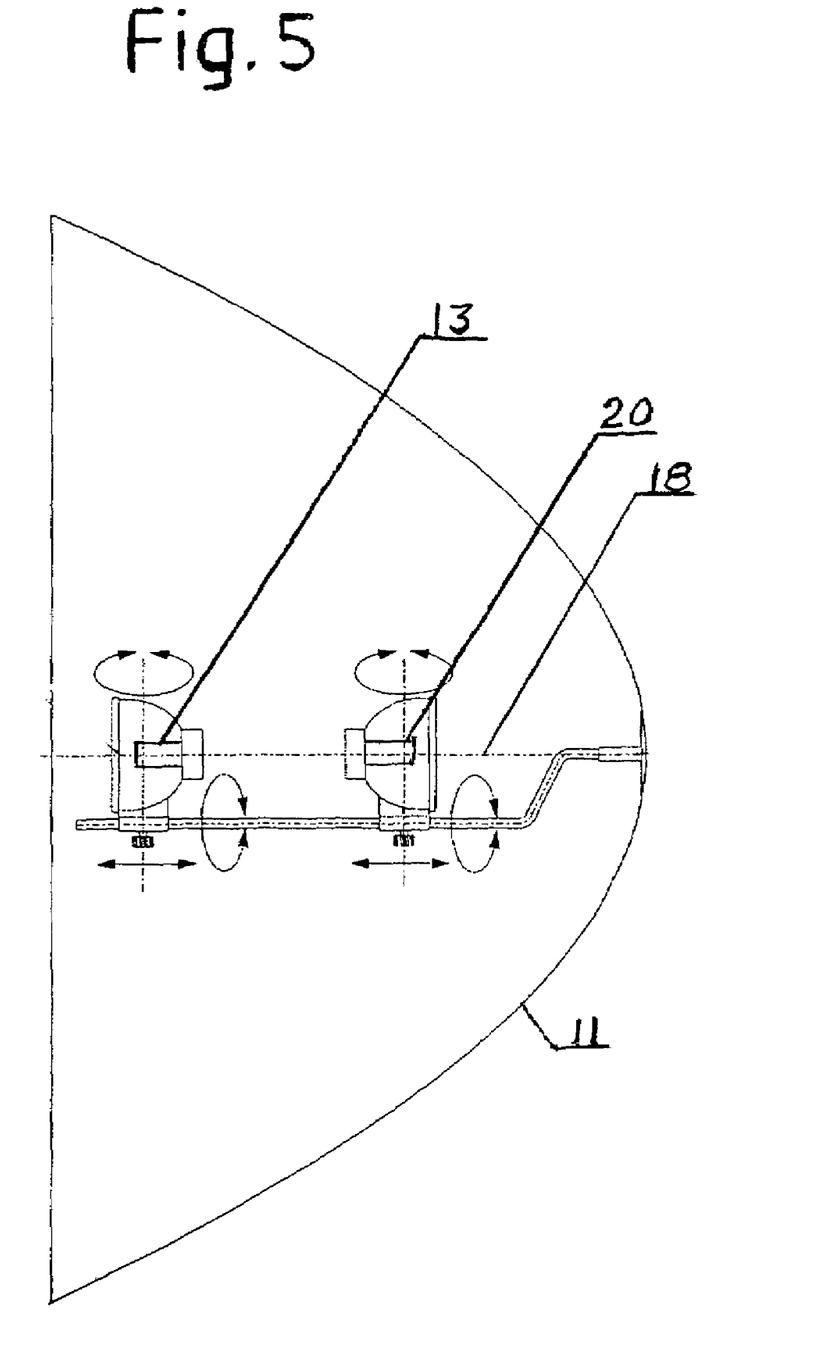
FIG. 5 is a side view of another embodiment of the reflector arrangement of the embodiment of FIG. 2.
Figure 6:
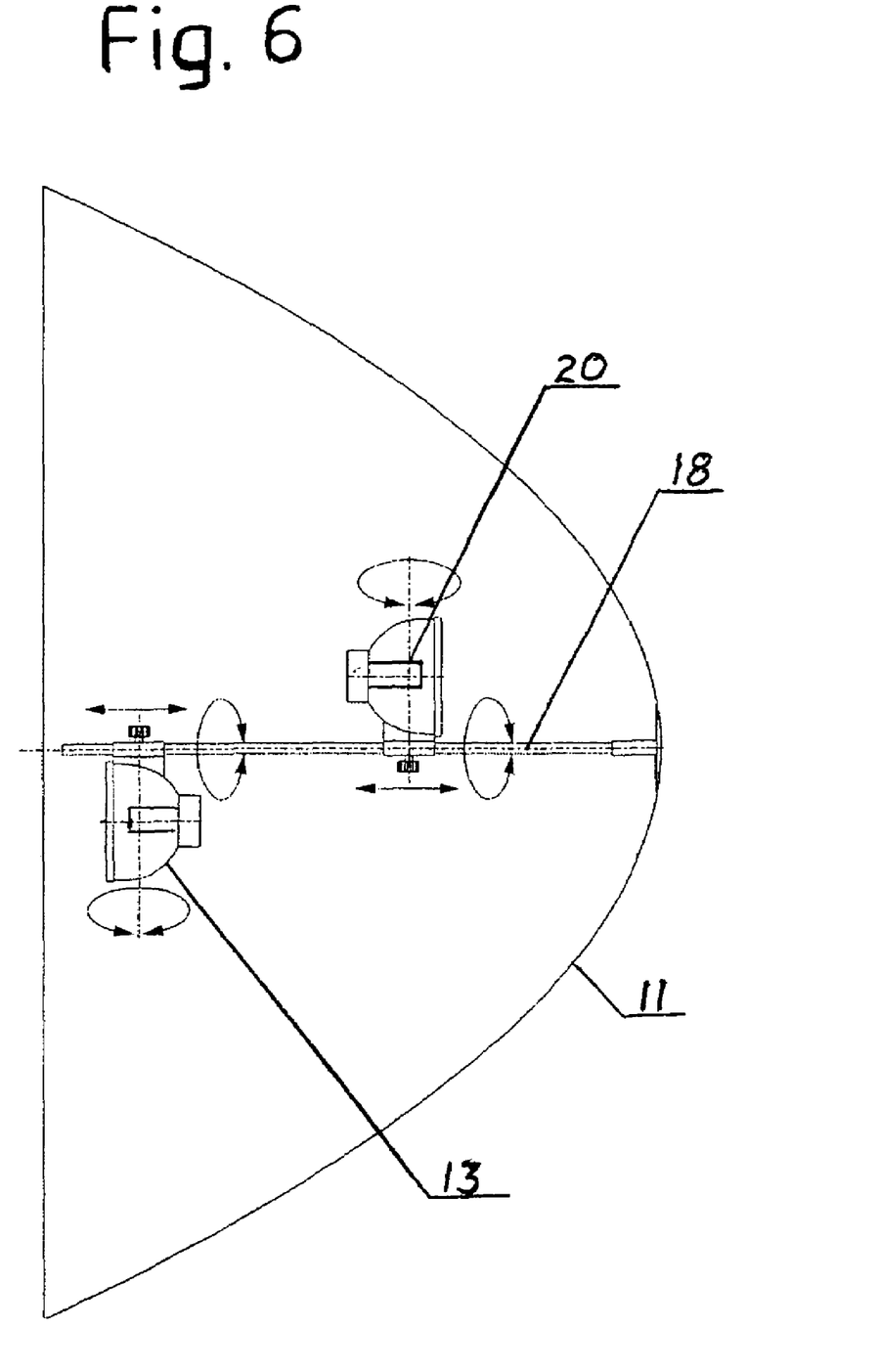
FIG. 6 is a side view of a further embodiment of the reflector arrangement of the embodiment of FIG. 2.
Figure 7:
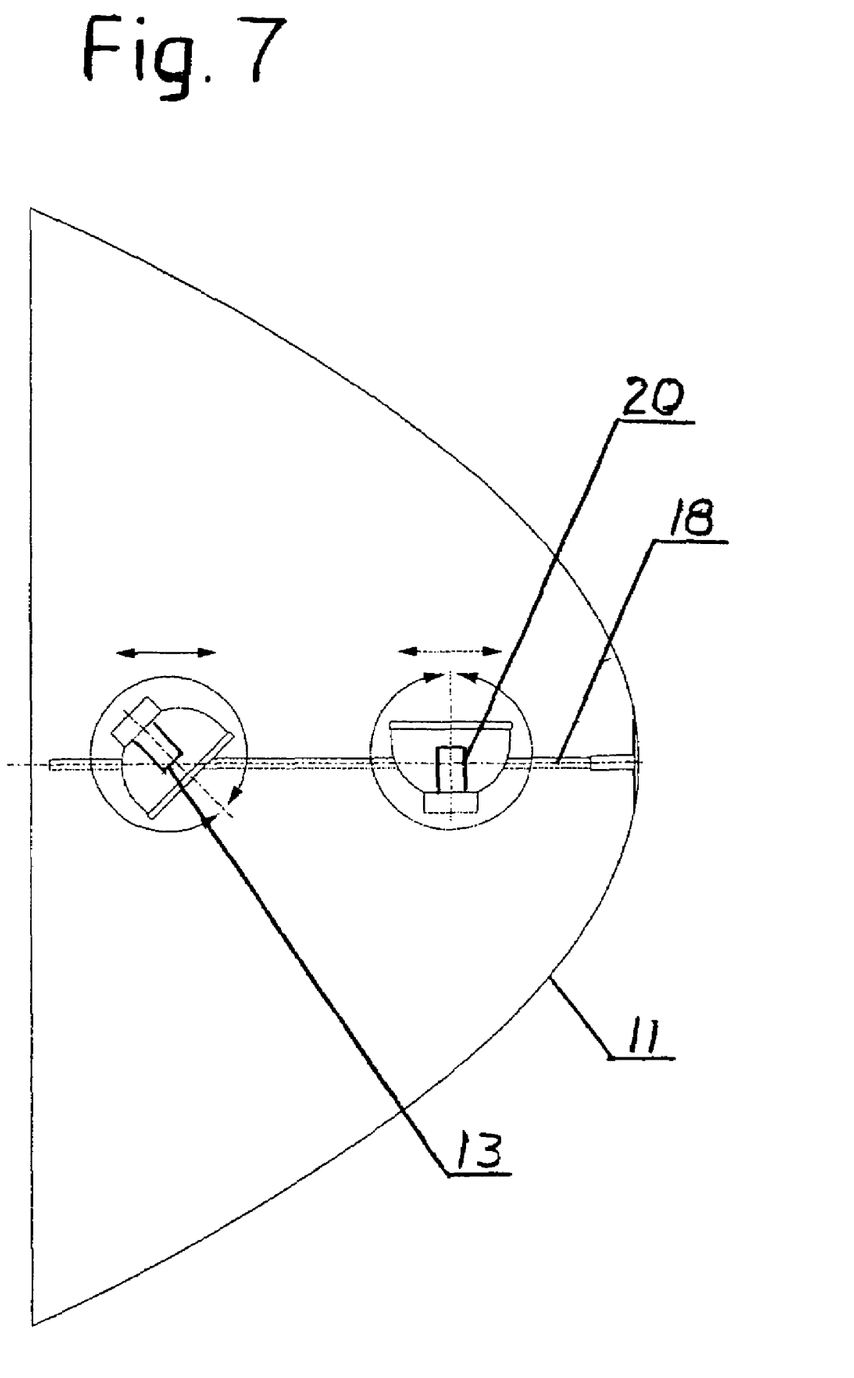
FIG. 7 is a side view of still another embodiment of the reflector arrangement of the embodiment of FIG. 2.

The two lighting means 13, 20 are located in the vicinity of the centre axis 18 and each connected to a separate energy source 17, 21. Preferably, the two lighting means 13, 20 are located on the common centre axis 18. Alternatively it is also conceivable that the two lighting means 13, 20 are connected to a common energy source and can be controlled separately only. Due to the possibility of separate control, that is, switching on and off as well, the most varied light conditions can be adjusted. In one embodiment, not shown, the lighting means 13, 20 are offset from each other in such a way that the centre axes 18 run parallel to but at a distance from each other as shown in FIGS. 5 and 6 or at an angle to each other as shown in FIG. 7. The reflectors 11, 14 too can as an alternative to the embodiments shown be offset from and/or inclined to each other.

In further embodiments, a filter element is provided at least in the region of one lighting means 13, 20. For the lighting means 13 at the free end 15 of the carrier element 12 or focusing unit 22, an ordinary plug-in filter 24 with receptacles for several filters 27 is provided. The plug-in filter 24 is mounted releasably in the region of the reflector 14. Single or multiple filters 27 can be introduced into the receptacles, so that the most varied colour compositions of the light rays 25, 26 can be selected. Alternatively or in addition the lighting means 20 is also provided with a usually cylindrical filter 28, so that the light rays 25 of the lighting means 20 can be pronounced in colour too.

The invention claimed is:

1. A reflector arrangement for an adjustment of shadow in a field of photography and film, including a first reflector (11), a second reflector (14) which is arranged inside the first reflector (11), wherein the two reflectors (11, 14) are arranged in a region of a center axis (18) of the reflector arrangement two lighting means (13, 20) arranged one behind each other near the center axis (18), and a carrier element (12) for receiving at least one of the lighting means (13, 20), characterised in that the carrier element (12) is constructed as a focusing unit (22) for the lighting means (13, 20) in such a way that the focusing unit (22) is slidable axially in a longitudinal direction of the center axis (18) of the reflectors (11, 14) relative to the first reflector (11), wherein the second reflector (14) is arranged in a region of the lighting means (13) on the focusing unit (22).

2. The reflector arrangement according to claim 1, characterised in that the second reflector (14) is slidable axially in the longitudinal direction of the center axis (18) on the focusing unit (22).

3. The reflector arrangement according to claim 1, characterised in that the lighting means (13, 20) are slidable as a unit with the focusing unit (22) axially in the longitudinal direction of the center axis (18).

4. The reflector arrangement according to claim 1, characterised in that the first lighting means (13) is arranged at a free end (15) of the focusing unit (22) and the second lighting means (20) is arranged in alignment therebehind.

5. The reflector arrangement according to claim 1, characterised in that the lighting means (13, 20) are offset from the center axis (18) and/or arranged at an angle to each other.

6. The reflector arrangement according to claim 1, characterised in that each lighting means (13, 20) is separately controllable, such that the luminosity or intensity is individually adjustable.

7. The reflector arrangement according to claim 1, characterised in that each lighting means (13, 20) is connected to a separate energy source (17, 21).

8. The reflector arrangement according to claim 1, characterised in that a filter element is arranged in a region of at least one of the lighting means (13, 20).

9. The reflector arrangement according to claim 8, characterised in that each filter element (24, 28) is designed with exchangeable filters (27).

10. The reflector arrangement according to claim 1, characterised in that each lighting means (13, 20) is provided with a filter element (24, 28).

11. The reflector arrangement according to claim 1, characterised in that the reflectors (11, 14) are offset from the center axis (18) and/or arranged at an angle to each other.

* * * * *

UNITED STATES PATENT AND TRADEMARK OFFICE
CERTIFICATE OF CORRECTION

PATENT NO. : 7,234,836 B2 Page 1 of 1
APPLICATION NO. : 10/534045
DATED : June 26, 2007
INVENTOR(S) : H. Briese It is certified that error appears in the above-identified patent and that said Letters Patent is hereby corrected as shown below:

Title page item 75
Correctly identify inventors street address as GEIBELSTRAßE 46A.

Signed and Sealed this

Thirtieth Day of October, 2007

JON W. DUDAS
*Director of the United States Patent and Trademark Office*